(12) United States Patent
Yen

(10) Patent No.: US 7,789,165 B1
(45) Date of Patent: Sep. 7, 2010

(54) INDUSTRIAL OIL COOKER FIRE PROTECTION SYSTEM

(76) Inventor: Ping Li Yen, 145 E. Live Oak Ave., Suite E, Arcadia, CA (US) 91006

( * ) Notice: Subject to any disclaimer, the term of this patent is extended or adjusted under 35 U.S.C. 154(b) by 472 days.

(21) Appl. No.: 11/893,568

(22) Filed: Aug. 17, 2007

(51) Int. Cl.
| A62C 3/00 | (2006.01) |
| A62C 37/10 | (2006.01) |
| A62C 37/36 | (2006.01) |
| A47J 37/12 | (2006.01) |
| A47J 36/00 | (2006.01) |

(52) U.S. Cl. .............. 169/65; 169/46; 169/52; 169/61; 99/404; 126/374.1

(58) Field of Classification Search ............ 169/46, 169/47, 51, 52, 54, 56, 60, 61, 65; 99/403–407; 126/299 R, 373.1, 374.1
See application file for complete search history.

(56) References Cited

U.S. PATENT DOCUMENTS

| 3,463,233 A | * | 8/1969 | Haessler ............... 169/47 |
| 3,824,374 A | * | 7/1974 | Mayher ............... 219/510 |
| 4,356,870 A | * | 11/1982 | Gaylord et al. ............... 169/65 |
| 5,820,776 A | * | 10/1998 | Hansen et al. ............... 252/2 |
| 6,173,791 B1 | | 1/2001 | Yen |
| 6,186,241 B1 | * | 2/2001 | Murr ............... 169/60 |
| 6,510,901 B2 | | 1/2003 | Yen et al. |
| 6,602,533 B1 | * | 8/2003 | Smith et al. ............... 426/438 |
| 2006/0272832 A1 | * | 12/2006 | Biehl ............... 169/65 |

* cited by examiner

Primary Examiner—Darren W Gorman
(74) Attorney, Agent, or Firm—William W. Haefliger

(57) ABSTRACT

A cooker system, comprising a relatively wide pan containing cooking oil at high temperatures, the pan extending longitudinally, for cooking edibles located longitudinally, single or multiple row water mist producing nozzles supported above the pan, there being one or more laterally spaced nozzles at longitudinally spaced locations above the pan, each nozzle producing mist substantially covering an area of at least about one square foot, at oil surface level in the pan, and control means to control pressurized water delivery to the nozzles, in the event of fire in or associated with oil in the pan.

16 Claims, 4 Drawing Sheets

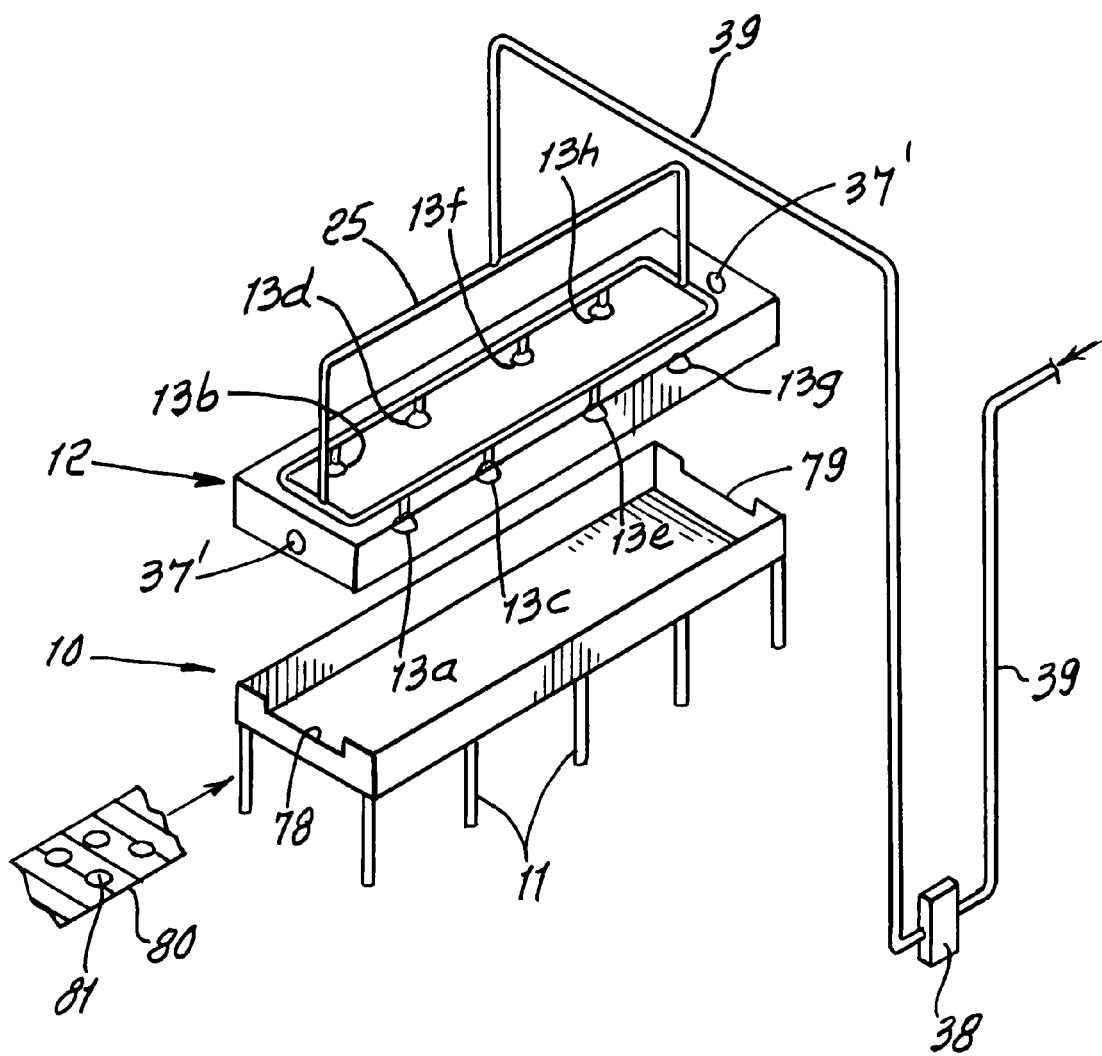

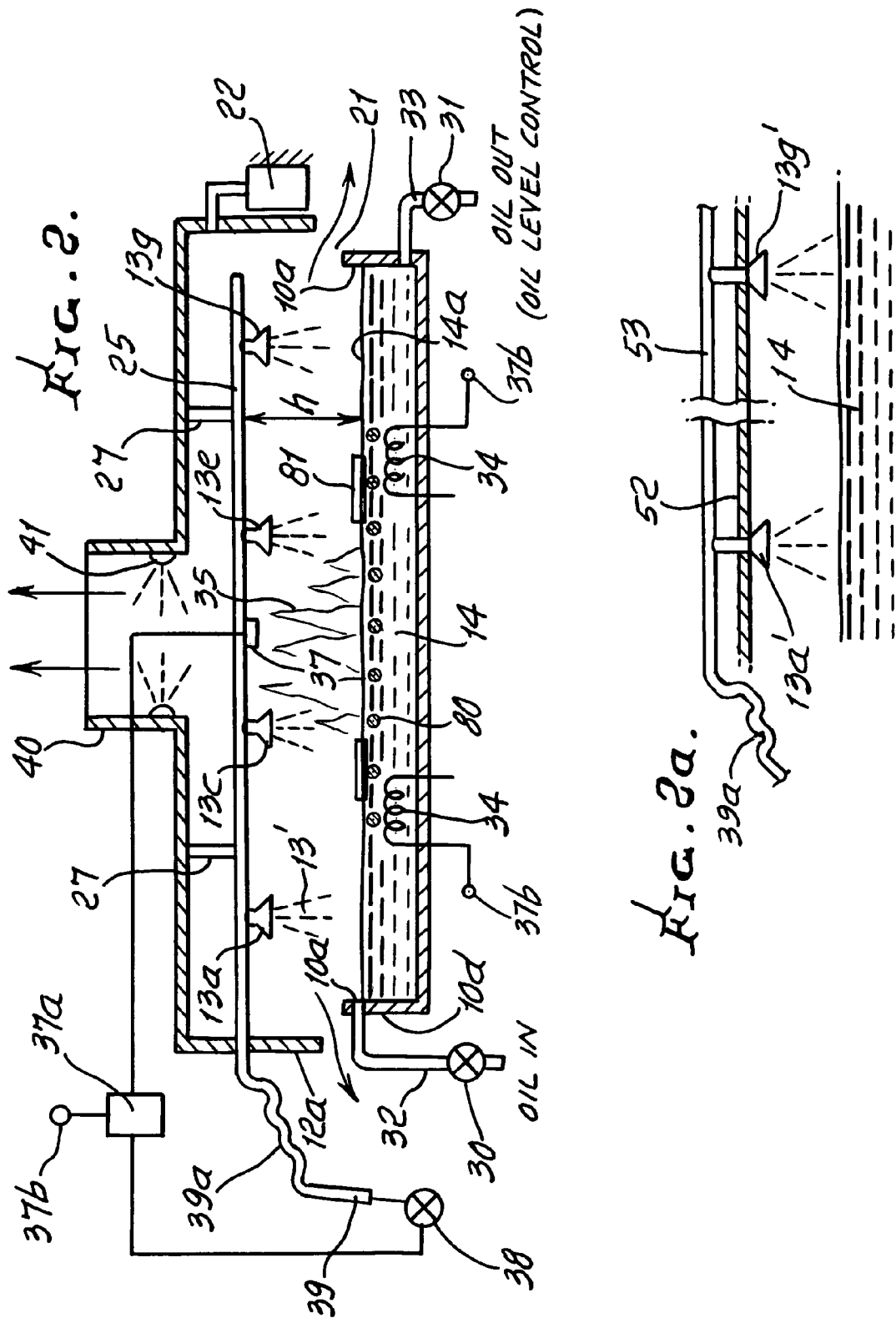

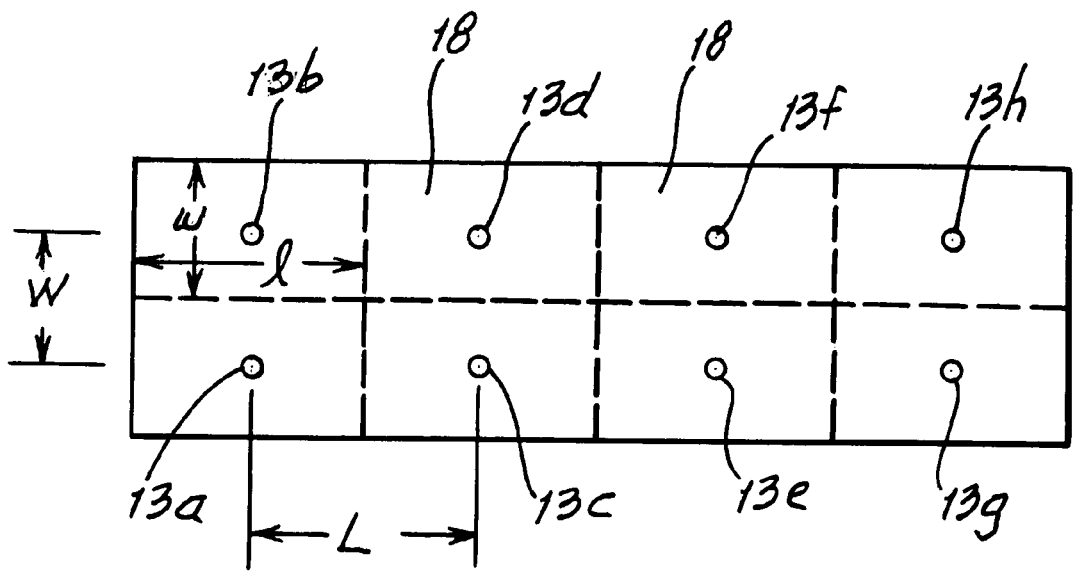
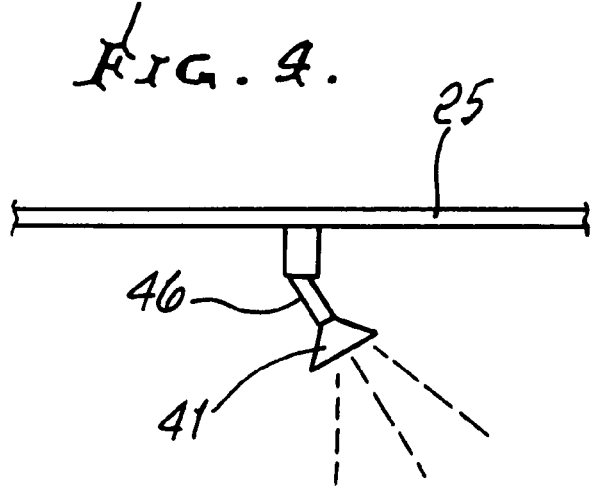

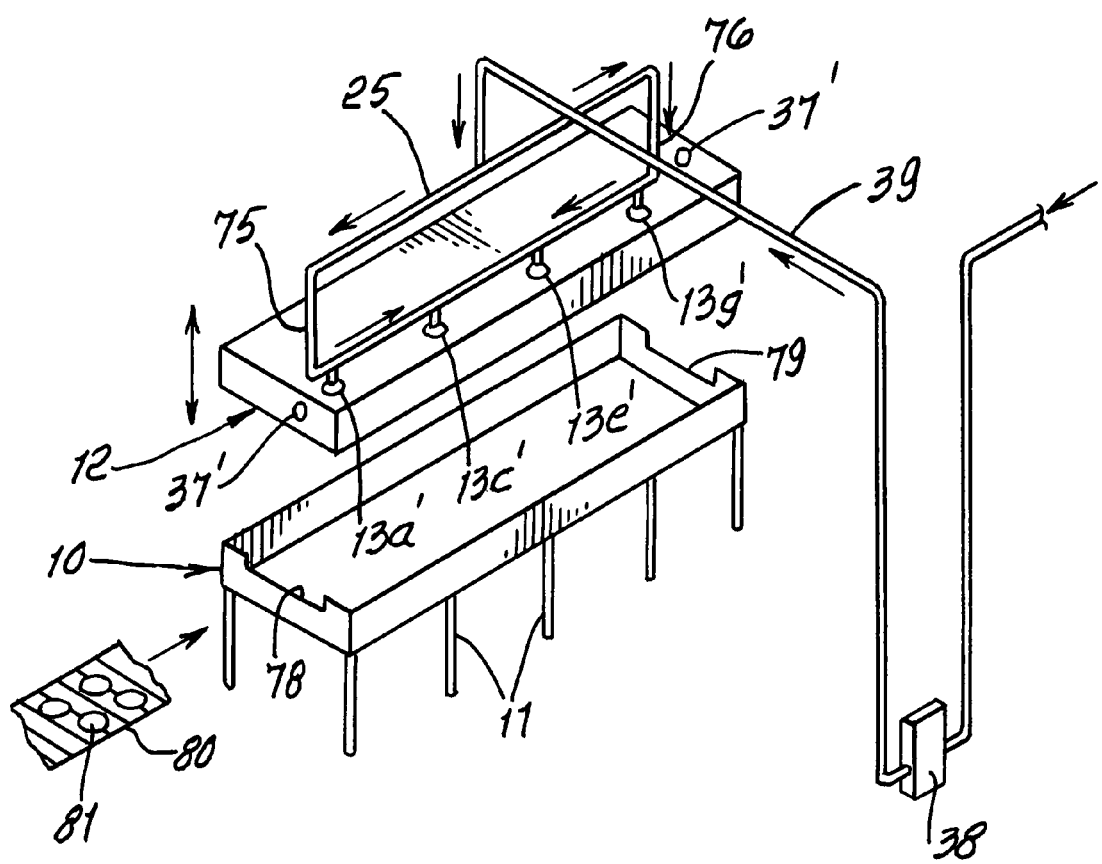

INDUSTRIAL OIL COOKER FIRE PROTECTION SYSTEM

BACKGROUND OF THE INVENTION

This invention relates generally to suppression of accidental fires involving cooking oil or fat as in industrial oil cookers, and more particularly concerns employment of pure water mist in such suppression, as well as extinction of such fires. Fires in the majority of these large cookers involve liquid cooking oil or fat fires. These fires are difficult to extinguish and are easily re-ignited.

There is great need for improvements in methods and means for suppressing such fires, extreme danger from fire resulting from the large sizes of such cookers.

SUMMARY OF THE INVENTION

It is a major object of the invention to provide method and apparatus to efficiently and effectively suppress such fires, through use of water mist. Such mists are non-toxic, and do not contribute to environmental problems.

Basically, the invention provides a method of extinguishing a fire characterized by production of flames openly rising above an upwardly presented liquid fat or grease zone in a large industrial cooker, the fat or grease being combustible to produce the fire. The steps of the method include a) providing a relatively wide pan containing cooking oil at high temperatures, the pan extending longitudinally, b) providing water mist producing nozzles supported above the pan, there being at least two laterally spaced nozzles at longitudinal locations above the pan, c) each nozzle sized for producing mist substantially covering an area of at least about 20 square feet, at oil surface level in the pan, d) and providing control means to control pressurized water delivery to the nozzles, in the event of fire in or associated with oil in the pan.

Rapid mist stream formation at each nozzle and travel into the flames is effected by supply of pure water to the nozzles at a pressure level between 50 and 1,500 psi, and preferably above 260 psi. Also, the length of time needed from turn on for mist stream delivery toward the fat or grease zone is typically less than about 10 seconds, for effecting flame extinction. The use of mist instead of water droplets assures such rapid flame extinction, since mist provides maximum water surface area exposed to the flame, with wide travel area distribution.

Another object is to eliminate or substantially reduce electrical or gas heating of the fat or grease in conjunction with flow of mist into and over the flames. For that purpose, the method may include detecting the presence of flames, and then effecting delivery of the water under pressure to the nozzles, to form the mist, while terminating such heating.

An additional object includes providing a water delivery pipe gridwork above the cooking oil in the pan, and supporting the nozzles. The gridwork may be supported by a hood extending over the pan, and the hood and gridwork may be vertically adjustable, to assure abundant mist coverage of oil in the pan, the oil top level being selectable.

Yet another object includes provision of a cooker system that includes a) a relatively wide pan containing cooking oil at high temperatures, the pan extending longitudinally, for cooking edibles located longitudinally, b) single or multiple row water mist producing nozzles supported above the pan, there being one or more laterally spaced nozzles at longitudinally spaced locations above the pan, c) each nozzle producing mist substantially covering an area of at least about one square foot, at oil surface level in the pan, d) and control means to control pressurized water delivery to the nozzles, in the event of fire in or associated with oil in the pan, e) said control means including a flame or heat detector or detectors, and circuitry and valving to initiate water flow to the nozzle or nozzles as in one or more rows, to provide mist production at all nozzles for abundant coverage of all the pan oil, in response to flame detection.

A further object is to provide nozzle elevation positions above the oil top level, being selected in relation to controlled elevation positions of the nozzles. Also, the cooking oil level in the pan is selected in relation to edibles to be cooked, and in height relation to the nozzles whose height levels is or are controlled. Nozzles may be preferentially directed or angled relative to vertical to effect propelling of the created mist in a preferred direction, longitudinally or laterally of the pan and oil, whereby mist coverage of (and flow relative to) hot spots in the oil may be assured for enhanced flame elimination safety.

These and other objects and advantages of the invention, as well as the details of an illustrative embodiment, will be more fully understood from the following specification and drawings, in which:

DRAWING DESCRIPTION

FIG. 1 is a schematic perspective view of an industrial oil cooker system;

FIG. 2 is a vertical section taken through the FIG. 1 system oil pan and hood;

FIG. 2a is a modification;

FIG. 3 is a schematic top plan view of a cooker pan, and location of water mist nozzles, longitudinally and laterally;

FIG. 4 is an elevational view showing a nozzle at selected and selectable angle, vertically; and FIG. 5 is a view like FIG. 1, but showing a modification.

DETAILED DESCRIPTION

Referring first to FIG. 1, it shows a longitudinally elongated cooker pan 10 supported on legs 11; a longitudinally elongated hood 12 directly above the pan; and mist producing or forming nozzles. The latter include a first pair of laterally spaced nozzles 13a and 13b; a second pair of laterally spaced nozzles 13c and 13d; a third pair of laterally spaced nozzles 13e and 13f; and a fourth pair of laterally spaced nozzles 13g and 13h. See also FIG. 3, showing nozzles in two longitudinally extending rows, lengthwise of the oil pan and hood.

The pairs of nozzles are longitudinally spaced apart, as for example at lengthwise equal distances L; and at widthwise lateral spacing of the two nozzles of each pair indicated at W. Below each nozzle is a rectangular surface zone 18 of the oil 14, of length "l" and width "w", where l > w. For example, for best results, l ≅ 5 feet w ≅ 4 feet Also, L ≅ 5 feet and W ≅ 4 feet. The placement of the nozzles as shown, and at vertical height "h" above oil surface 14a (see FIG. 2) is such that the mist created and propelled downwardly from each nozzle, diverges as shown at 13' and impinges on the oil surface, the mist flowing or turning (i.e. traveling) longitudinally and laterally to cover the oil in that zone 18 below that nozzle, whereby all zones 18 become covered with traveling and spreading mist that serves to extinguish any flames above the hot oil, as by exclusion of air to the hot oil. Thus, each nozzle may be centered above a zone 18, and the mist created and flowing laterally toward the pan side wall upper edges 10*a* tends to build up at those edges, and may flow outwardly over those edges, as via gaps 21 between the pan walls and hood walls 10*d* and 12*a*. Also the nozzles closest to the longitudinally spaced ends of the pan and hood are directed to produce mist flow to the center of the pan, driving flames away from such opposite ends at which edibles may be conveyed into and out of the oil in the pan. See for example conveyor 80 traveling longitudinally.

As will appear, the hood height above the pan may be selected, as for example constructed, or set as by a hood vertical driver 22, so that the nozzles 13 and water ducting 25 (in gridwork as shown) may be positioned vertically above the selected oil surface at a level to assure mist suppression of flames or combustion at the oil surface. In this regard, the ducting 25 may be carried by the hood to be moved vertically therewith, and hood support of the ducting is seen at 27 in FIG. 2.

As also shown, oil top surface level in the pan may be controlled as by inlet and outlet valves 30 and 31 in oil supply and drain piping 32 and 33; heating of the oil is for example indicated by electrical heater coils 34; flames being suppressed are indicated at 35; a flame or combustion detector is shown at 37; and circuitry 37*a* is responsive to flame detection at 37 to control (i.e. open) valves 38 in water supply line 39 extending to ducting 25. Circuitry 37*a* also controls, at 37*b*, the heating of the oil, to reduce or eliminate such heating if flames are detected. See 37'. Line 39 may have flexible extent at 39*a* to accommodate to vertical movement of the hood. Water pressure to the nozzles is between 50 and 1,500 psi. A hood chimney or vent 40 exhausts cooking gases, and combustion products; and mist nozzles 41 may be located at vent 40, as shown. In FIG. 1, flame detectors are shown at 37' at opposite ends of the hood.

FIG. 4 shows provision for nozzle 41 selectable azimuth and height angulation or direction at 46 that may be such as to cause mist to be propelled in a selected lateral or longitudinal direction component, to concentrate mist for example above oil hot spots, to assure flame suppression. Flames are shown at 35, in FIG. 2.

FIG. 2*a* shows a modification in which mist forming nozzles 13*a'* - - - 13*g'* are directly carried by the hood top wall 52 to project through that wall. Water supply line 53 is protectively located above that top wall, so as to avoid destructive direct contact with flames rising above the oil.

In FIG. 5, the elements like those in FIG. 1 bear the same numerals. Other elements include the single (instead of double) row of mist spray nozzles 13*a'*, 13*c'*, 13*e'*, and 13*g'* carried by the hood to move up and down therewith. Piping 25, 39, 75, 76, and 77 above the hood supplies pressurized water to the nozzles in the single row, above the cooking oil in pan 10. The pan has entrance and exit openings 78 and 79 at its opposite ends, to pass a longitudinally movable conveyor 80 carrying edibles 81 to be cooked.

I claim:

1. Cooker system, comprising:
   a) a relatively wide pan containing cooking oil at high temperatures, the pan extending longitudinally, for cooking edibles located longitudinally,
   b) single or multiple row water mist producing nozzles supported above the pan, there being one or more laterally spaced nozzles at longitudinally spaced locations above the pan,
   c) each nozzle producing mist substantially covering an area of at least about one square foot, at oil surface level in the pan,
   d) and control means to control pressurized water delivery to the nozzles, in the event of fire in or associated with oil in the pan,
   e) there being a vertically movable hood above the pan, the hood having a top wall extending over oil in the pan, the nozzles carried at said top wall, and a water supply line above said top wall and extending to the nozzles.

2. The system of claim 1 wherein said area is a rectangular area of about 4 feet by 5 feet.

3. The system of claim 2 wherein said areas covered by mist spray subtend substantially all the oil in the pan.

4. The system of claim 1 including a water delivery pipe gridwork above the cooking oil in the pan, and supporting the nozzles.

5. The system of claim 2 including said hood supporting a water delivery gridwork.

6. The system of claim 5 in which the hood is supported for movement vertically, to elevate and lower the gridwork and nozzles, to assure mist coverage of all oil in the pan, the oil level being selectable.

7. The system of claim 1 wherein the water pressure supplied to the nozzles is between 50 and 1500 psi.

8. The system of claim 1 wherein there are an edible or edibles in the pan in contact with the oil in the pan, the oil top level being selected in relation to controlled elevation positions of the nozzles, to enable mist coverage of all oil in the pan, and an edibles conveyor traveling longitudinally in the pan, below nozzle rows.

9. The system of claim 1 wherein the selected positions of the nozzles above the oil top level are controlled so that mist produced by the nozzles will travel laterally to pan edges, directly above the oil in the pan, and along the pan length.

10. The system of claim 1 wherein the nozzles are selectively directed relative to vertical, and azimuthly to assure mist coverage of hotter zones in the oil.

11. The method of suppressing flame production in or associated with hot cooking oil in a relatively large size, longitudinally extending pan, that includes the steps
   a) providing a relatively wide pan containing cooking oil at high temperatures, the pan extending longitudinally,
   b) producing water mist at nozzles supported above oil level in said pan, the nozzles spaced apart laterally so that mist from each nozzle covers only part of the lateral extent of oil in the pan, at selected oil level,
   c) each nozzle producing mist substantially covering an area of at least about one square foot, at oil surface level in the pan,
   d) providing and operating control means to control pressurized water delivery to the nozzles, in the event of fire in or associated with oil in the pan,
   e) providing water delivery pipe gridwork above the cooking oil in the pan, and supporting the nozzles,
   f) providing a hood over the pan, and supporting the gridwork,
   g) and supporting the hood for movement, vertically, to elevate and lower the gridwork and nozzles, to assure mist coverage of all oil in the pan, the oil level being selectable.

12. The method of claim 11 including cooking an edible or edibles in the pan in contact with the oil in the pan, the oil top level being selected in relation to controlled elevation positions of the nozzles.

13. The method of claim 11 wherein the elevation positions of the nozzles above the oil top level is controlled so that mist produced by the nozzles will travel laterally to and over pan edges, and directly above the oil in the pan, and along the pan length.

14. The system of claim 1 wherein said control means includes at least one flame or heat detector, and circuitry and valving to initiate water flow to the nozzle or nozzles as in one or more rows, to provide mist production at all nozzles for abundant coverage of all the pan oil, in response to flame detection.

15. The system of claim 14 wherein the nozzles extend in two rows extending longitudinally and being laterally spaced, the nozzles longitudinally spaced apart in each row.

16. The system of claim 14 wherein there is only one row of nozzles, which are longitudinally spaced apart.

* * * * *